July 22, 1952  W. I. STEARNS  2,604,282
MOTOR MOUNT
Filed May 4, 1950
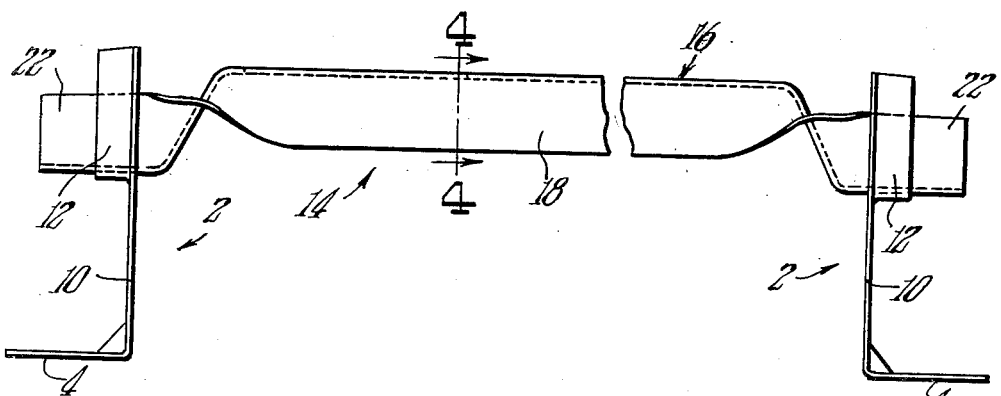
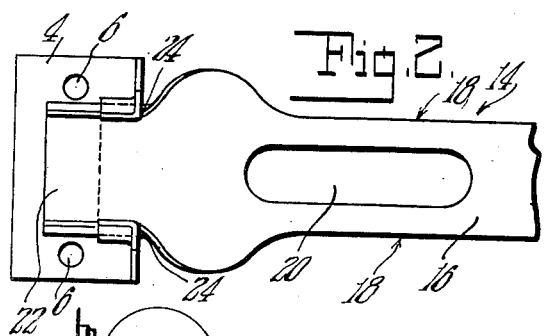
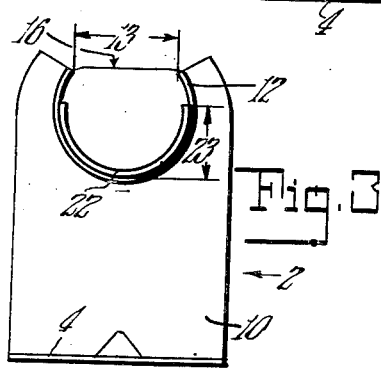
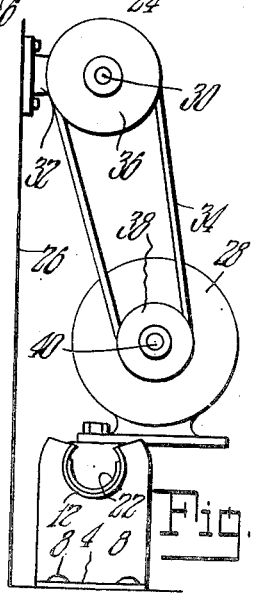
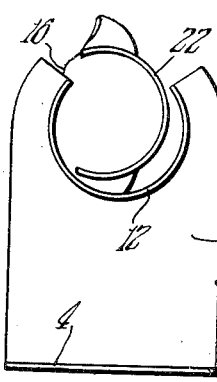
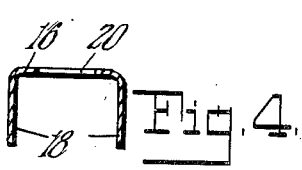
INVENTOR.
Walter I. Stearns.
BY
Ross & Ross Patented July 22, 1952

2,604,282

UNITED STATES PATENT OFFICE 2,604,282

MOTOR MOUNT

Walter I. Stearns, Arlington, Vt.

Application May 4, 1950, Serial No. 160,007

1 Claim. (Cl. 248—19)

My invention relates to mounting means for motors and the like.

The principal objects of the invention are directed to the provision of a mount for electric motors or the like which is characterized by its simplicity, its low cost of production and its efficiency of operation.

According to novel features of the invention, a pair of brackets and an elongated support are formed from sheet metal or from castings if desired.

The brackets are provided with bearings having entrance slots and the support is provided with journals at opposite ends thereof which are insertable through the slots of the bearings thereinto whereby the support is oscillatable relative to the bearings.

All of the above objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Figs. 1 is a side elevational view of the mount of my invention,

Fig. 2 is a plan view of one end of the support and associated bracket,

Fig. 3 is an end elevational view of the mount shown in Fig. 1,

Fig. 4 is a sectional elevational view on the line 4—4 of Fig. 1,

Fig. 5 is a view similar to Fig. 3 showing the support and a bracket in a different relative position, and Fig. 6 is a small scale elevational view showing the mount as it is used in connection with a motor in one form of the invention.

In the above mentioned drawing annexed hereto and forming a part of this specification, I have shown but one embodiment of my invention which is deemed preferable, but it is to be understood that changes and modifications may be made within the scope of the appended claim without departing from the spirit of the invention.

Referring now to the drawing more in detail, and referring more particularly to the preferred form of my invention selected for illustrative purposes, I have shown brackets 2 which are preferably formed from sheet metal to have foot portions 4 provided with holes 6 for screws as 8 or bolts for securing the brackets in the desired spaced relation.

Plate portions 10 extend upwardly from said foot portions 4 and have upper portions formed to provide bearings, such as 12. The bearings are of a certain diameter and have entrance slots thereinto of a certain width indicated by 13 which is relatively less than said certain diameter.

It will be understood that if desired, two brackets may be placed back to back and held together in a secured relation as by bolts or the like when heavy loads are supported.

An elongated support 14 is preferably formed from sheet metal and is channel-shape in cross section throughout the greater part of its length, there being an upper relatively flat supporting portion 16 and side portions 18 depending therefrom.

The supporting portion is provided with apertures which may be in the form of slots 20 adapted to receive bolts or the like for securing a motor thereto.

At opposite ends of the support 4 the side portions 18 are turned upwardly and outwardly with central portions therebelow displaced downwardly below the plane of the supporting portion 16 to form portions of cylindrical journals 22 of a diameter adapted to fit in the bearings 12 as shown in Figs. 1, 2 and 3 and oscillate therein.

The vertical height of the journals is less than the diameter thereof as indicated by 23 in Fig. 3.

Opposite end portions of the support 14 inwardly of the journals are formed to provide shoulders 24 (see Fig. 2).

With the brackets 2 secured to a support, support member 14 may be positioned, as in Fig. 5, so that the journals 22 of the support may be passed into and out of the bearings through the slots 13 thereof.

The bracket members 2 will be so positioned that the shoulders 24 at opposite ends of the support abut inner sides of the brackets thereby to prevent longitudinal movements of the support relative to the brackets.

With the journals in the bearings of the brackets, the support may oscillate in opposite direction.

The device may be used for various purposes but for purposes of disclosure the brackets 2 are secured to a support 26 the correct distance apart and the support having a motor 28 secured thereto has its journals disposed in the bearings of the bracket.

A shaft is represented by 30 which is rotatable in a bearing or bearings 32 secured to support and is operatively connected by a belt 34 or the like which engages pulleys 36 and 38 on said shaft 30 and a shaft 40 of the motor 28.

In the arrangement shown and described, the support may oscillate in the bearings of the brackets and the weight of the motor functions to maintain the desired tautness of the belt.

The support is readily insertable in and removable from the brackets and the components may be made to accommodate motors of various types and sizes.

The device is so arranged that various locations or positions of the motor relative thereto can be maintained and compensated for in instances such as, for example, where a machine operates like a planer and where changes in thickness of a piece of work have to be taken into account. That is to say, by means of my invention such changes can be easily and quickly taken into account.

Also, if desired, a lock member (not shown) may be associated with the entrance slot of the bracket 2 for enclosing the journal 22 within the bearing 12 when in the assembled position.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description and all modifications and variations as fall within the meaning and purview and range of equivalency of the appended claim are therefore intended to be embraced therein.

What it is desired to claim and secure by Letters Patent of the United States is:

A three part construction for swingably mounting a motor on a support comprising in combination, a motor supporting member and a pair of end brackets, said motor supporting member formed from a single elongated strip of sheet metal to have an elongated central portion and longitudinal marginal flange portions at opposite longitudinal sides thereof, an intermediate portion of the central portion of said member having an elongated horizontal motor supporting face terminating at opposite ends inwardly of opposite ends of said member and the marginal flange portions at the opposite sides of said surface depending downwardly therefrom, end portions of the central portion of said member at opposite ends of the supporting surface extending downwardly from said ends and end portions of the marginal flanges at the sides of said first-named end portions extending outwardly and upwardly in planes intersecting the planes of said end portions and the extremities of said end portions terminating in elongated hollow journals having aligned horizontal axes disposed parallel to and below the plane of said supporting face, said journals being substantially semi-circular in transverse cross section with axial slots along upper sides thereof and having a certain vertical dimension, said end brackets formed from elongated strips of metal to have horizontal lower portions for securement to a support and plate portions extending upwardly vertically therefrom, upper portions of said vertical plate portions being displaced outwardly at right angles thereto in the form of substantially semi-circular elongated bearings adapted for relative axial alignment and having axial openings along upper sides thereof, said slots of the bearings of the brackets having a transverse width adapted for insertion of the journals of the motor supporting member downwardly therethrough with the supporting face of said member disposed substantially and the said journals and bearings arranged for rotatably supporting the journals in said bearings.

WALTER I. STEARNS.

REFERENCES CITED

The following references are of record in the file of this patent:

UNITED STATES PATENTS

| Number | Name | Date |
|---|---|---|
| 1,135,361 | Cottle | Apr. 13, 1915 |
| 1,942,834 | Railley | Jan. 9, 1934 |
| 2,185,215 | McCabe et al. | Jan. 2, 1940 |
| 2,323,153 | Pilson | June 29, 1943 |
| 2,344,681 | Deschner | Mar. 21, 1944 |
| 2,433,693 | Hall | Dec. 30, 1947 |
| 2,464,743 | Evans et al. | Mar. 15, 1949 |

FOREIGN PATENTS

| Number | Country | Date |
|---|---|---|
| 650,833 | France | Oct. 1, 1928 |